(12) United States Patent
McKenzie et al.

(10) Patent No.: US 12,307,494 B2
(45) Date of Patent: May 20, 2025

(54) AUTHENTICATION OF PRODUCTS

(71) Applicant: Citizens Reserve, Inc., Los Gatos, CA (US)

(72) Inventors: Addison David McKenzie, Los Gatos, CA (US); Yonathan Lapchik, Miami, FL (US); Garrett Lee, Nashville, TN (US)

(73) Assignee: Citizens Reserve, Inc., Los Gatos, CA (US)

( * ) Notice: Subject to any disclaimer, the term of this patent is extended or adjusted under 35 U.S.C. 154(b) by 758 days.

(21) Appl. No.: 17/170,578

(22) Filed: Feb. 8, 2021

(65) Prior Publication Data
US 2021/0248653 A1     Aug. 12, 2021

Related U.S. Application Data

(60) Provisional application No. 63/125,893, filed on Dec. 15, 2020, provisional application No. 62/971,484, filed on Feb. 7, 2020.

(51) Int. Cl.
*G06Q 30/00*     (2023.01)
*G06F 21/60*     (2013.01)
(Continued)

(52) U.S. Cl.
CPC ....... *G06Q 30/0611* (2013.01); *G06F 21/602* (2013.01); *G06Q 30/018* (2013.01);
(Continued)

(58) Field of Classification Search
CPC .............. G06Q 30/0611; G06Q 30/018; G06F 21/602; H04L 9/0618; H04L 9/0643; H04L 9/50; H04L 2209/56
(Continued)

(56) References Cited

U.S. PATENT DOCUMENTS 10,528,776 B1 *   1/2020   Levy .................. G06Q 30/0601
2009/0008450 A1   1/2009   Ebert et al.
(Continued)

OTHER PUBLICATIONS

VeriTransfer(TM) Unveils the First Known Proof-of-Concept for a Blockchain Enabled Firearms Licence Verification and Ownership Transfer: Blockchain Enabled Firearms Solution . . . NASDAQ OMX's News Release Distribution Channel [New York] Jul. 12, 2018; Dialog #2122799438 3pgs. (Year: 2018).*
(Continued)

*Primary Examiner* — Robert M Pond
(74) *Attorney, Agent, or Firm* — Perkins Coie LLP

(57) ABSTRACT

Systems and methods for authenticating products, such as products from original manufacturers and/or resellers, that provide a trusted and reliable mechanism for buyers and sellers to prove the authenticity of a product and for authenticators to establish an authentication that can be relied on during downstream transactions is provided. In some embodiments, a blockchain-based product authentication system is provided that allows entities within a chain of commerce (e.g., suppliers, manufacturers, distributors, retails, consumers, consignors, resellers) to verify the authenticity of items by way of trusted authenticators and trusted audit processes. The product authentication system enables users to rely on product authentications via off-channel sales with the use of cryptography, blockchain, digital assets, and tagging hardware and software.

21 Claims, 7 Drawing Sheets

(51) Int. Cl.
    *G06Q 30/018*     (2023.01)
    *G06Q 30/0601*     (2023.01)
    *H04L 9/06*     (2006.01)
    *H04L 9/00*     (2022.01)

(52) U.S. Cl.
    CPC .......... *H04L 9/0618* (2013.01); *H04L 9/0643* (2013.01); *H04L 9/50* (2022.05); *H04L 2209/56* (2013.01)

(58) Field of Classification Search
    USPC ..................................................... 705/26, 27
    See application file for complete search history.

(56) References Cited

U.S. PATENT DOCUMENTS

| | | |
|---|---|---|
| 2012/0319815 A1 | 12/2012 | Feldman |
| 2016/0283920 A1 | 9/2016 | Fisher et al. |
| 2017/0032382 A1 | 2/2017 | Shulman et al. |
| 2017/0213059 A1 | 7/2017 | Koch et al. |
| 2018/0374130 A1* | 12/2018 | Salem ................ G06Q 30/0609 |
| 2019/0394026 A1* | 12/2019 | Bookman ................ H04L 9/50 |
| 2021/0103938 A1* | 4/2021 | Bulawski ............ H04L 63/0853 |
| 2021/0248594 A1* | 8/2021 | Yantis ....................... H04L 9/50 |

OTHER PUBLICATIONS

Buterin, V., "Quorum Whitepaper," accessed Feb. 8, 2021, from https://raw.githubusercontent.com/jpmorganchase/quorum-docs/master/Quorum%20Whitepaper%20v0.1.pdf, 2013, 8 pages.
Ethereum Whitepaper https://github.com/ethereum/wiki/wiki/White¬Paper.
Hedera: A Public Hashgraph Network & Governing Council (last updated Aug. 15, 2020).
International Search report and Written Opinion issued in Application No. PCT/US21/17119, dated Jul. 22, 2021, 14 pages.
Nakamoto, S., "Bitcoin: A Peer-to-Peer Electronic Cash system," accessed Feb. 8, 2021 from https://www.ussc.gov/sites/default/files/pdf/training/annual-national-training-seminar/2018/Emerging_Tech_Bitcoin_Crypto.pdf, 9 pages.
Quorum Whitepaper https://raw.githubusercontent.com/jpmorganchase/quorum-docs/master/Quorum%20Whitepaper%20v0.1.pdf, committed on Nov. 22, 2016.
U.S. Appl. No. 63/125,893, filed Dec. 15, 2020, 11 pages.

* cited by examiner

| product ID 310 | tag ID 320 | owner 325 | tampered with/ stolen/lost? 330 | date₁ 331 | authenticator₁ 332 | ... | dateₙ 331 | authenticatorₙ 332 |
|---|---|---|---|---|---|---|---|---|
| AF214 | C213D | userID | True | 1/2/2020 | manufacturer ID | ... | 3/2/2020 | third party ID |
| 00124 | 2F148 | userID | False | 2/10/2017 | manufacturer ID | ... | | |
| 89713 | 34124 | N/A | False | 4/17/2019 | third party ID | ... | 4/17/2019 | manufacturer ID |
| F3215 | A5486 | manufacturer ID | True | 8/15/2018 | manufacturer ID | ... | 8/15/2018 | manufacturer ID |
| 55847 | N/A | userID | False | 12/15/2019 | third party ID | ... | 9/15/2019 | third party ID |
| B5347 | 54AFE | manufacturer ID | True | 7/22/2020 | manufacturer ID | ... | 10/22/2020 | manufacturer ID |
| ... | ... | ... | ... | ... | ... | ... | ... | ... |

AUTHENTICATION OF PRODUCTS

CROSS-REFERENCE TO RELATED APPLICATIONS

This application claims the benefit of U.S. Provisional Patent Application No. 62/971,484, filed on Feb. 7, 2020, entitled "Authentication of Products" and further claims the benefit of U.S. Provisional Patent Application No. 63/125,893, filed on Dec. 15, 2020, entitled "Tamper-Evident NFC Tags and Associated Systems and Methods." Each of the above-identified applications is herein incorporated by reference in its entirety.

BACKGROUND

Proving authenticity of goods to a consumer is becoming one of the most essential requirements for the sale of goods, particularly when the goods are sold on secondary marketplaces including, for example, boutiques, retailers, consignment shops, and so on. Most solutions are very short-sighted, requiring organizations to go through extensive and/or repeated effort without much return outside of consumer comfort. Additionally, not all solutions work well, often attaching tags or chips to products that are easy to counterfeit. Typical business models for companies that provide an authentication service require an expert team to authenticate products that buyers are looking to resell through their platforms. Once a buyer shows up and there is a match with a seller, the product is authenticated (a fee is charged for the service) and then delivered to the buyer with an authentication card or certificate. The core of these reselling platforms is their authentication services, but they are not able to keep monetizing that service when the products they originally sold to a buyer are resold again off their markets.

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key (of a public/private key pair) to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header, that contains a hash digest of all the transaction identifiers within the block. The hash of the previous block is recorded in the header of the next block in the chain, creating a mathematical hierarchy called a "blockchain." To verify the current owner, the blockchain of transactions can be followed to verify each transaction from the first transaction to the last transaction. The new owner only needs to have the private key that is associated with the public key of the recipient of a transaction. The blockchain creates a mathematical proof of ownership by providing an immutable list of transactions that are linked to each other which makes it impossible to send 1 bitcoin to more than 1 party (double spend). It's pseudonymous.

To ensure that a previous owner of a bitcoin did not double-spend the bitcoin (i.e., transfer ownership of the same bitcoin to two parties), the bitcoin system maintains a distributed ledger of transactions. Transaction interdependencies (you need to have bitcoin before you send it) and consensus mechanisms are key to prevent double spending. With the distributed ledger, a ledger of all the transactions for a bitcoin is stored redundantly at multiple nodes (i.e., computers) of a blockchain network. The ledger at each node is stored as a blockchain. In a blockchain, transactions are stored in order and each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce, or arbitrary value, that is added to the block when it is created. A bitcoin ledger is sometimes referred to as an Unspent Transaction Output ("UTXO") set because it tracks the output of all transactions that have not yet been spent.

Efforts are currently underway to use blockchains to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. For example, a person can be uniquely identified using a combination of a user name, social security number, and biometric (e.g., fingerprint). Additionally, a product (e.g., refrigerator) can be uniquely identified using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) involving the asset stored in a blockchain, creating a full audit trail of the transactions.

To record a simple transaction in a blockchain, each party and asset involved with the transaction needs an account that is identified by a digital identity. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements codified terms of a contract. The algorithm in the smart contract is executed in a decentralized way by every node that is running the blockchain. To execute the contract code, the platform uses a deterministic virtual machine platform (e.g., an Ethereum platform, which provides a virtual machine) that supports recording transactions in blockchains. In addition, the smart contract itself is recorded as a transaction in the blockchain so that the integrity of the computer code is ensured. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset, such as a car. The inputs to a smart contract to sell a car may be 1) the identity tokens of the seller, 2) the identity tokens of the buyer, 3) the identity token of the car, and 4) the sale price in U.S. dollars. The computer code ensures that the seller is the current owner of the car and that the buyer has sufficient funds in their account. The computer code then records a transaction that transfers the ownership of the car to the buyer and a transaction that transfers the funds from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the integrity of the blockchain, large amounts of computer resources are required to support such redundant execution of computer code.

A product may need to be authenticated for any number of reasons. For example, a buyer may want to confirm that an item is, in fact, from the purported manufacturer and not a counterfeit, particularly when the item is expensive, a luxury item, and/or an item sold on secondary marketplaces. Similarly, sellers of such products will want to be able to prove to potential buyers that the products they are selling are authentic. As another example, buyers and sellers may want to prove that products labeled with certain certifications (e.g., "premium," "organic," "eco-friendly") or Protected Geographical Indications have actually been certified and/or labeled by a trusted entity. In other words, the buyers and sellers may wish to prove the authenticity of certain certifications for products.

Supply chains are ubiquitous but are becoming increasingly complex, functionally limited, and in need of innovation. Moreover, logistics costs are deterring businesses while companies are faced with fragmented supply chains and millions of fraudulent products continually find their way into global markets. These challenges also lead to more serious consequences affecting the globe, such as food sourcing problem, inhumane working conditions, and so on. Typical business models for companies that provide an authentication service require an expert team to authenticate products that buyers are looking to resell through the authentication service's platform. Once a buyer shows up and there is a match with a seller, the product is authenticated (they charge a fee for the service) and then delivered to the buyer with an authentication card or certificate. The core of these reselling platforms is their authentication service, but they are unable to keep monetizing that service when the product they originally sold to a buyer is resold again off the authentication service's platform. Accordingly, there remains a need for better authentication techniques.

BRIEF SUMMARY OF THE DRAWINGS

FIG. 3 is a data diagram illustrating a product authentication store.

DETAILED DESCRIPTION

Figure 1:
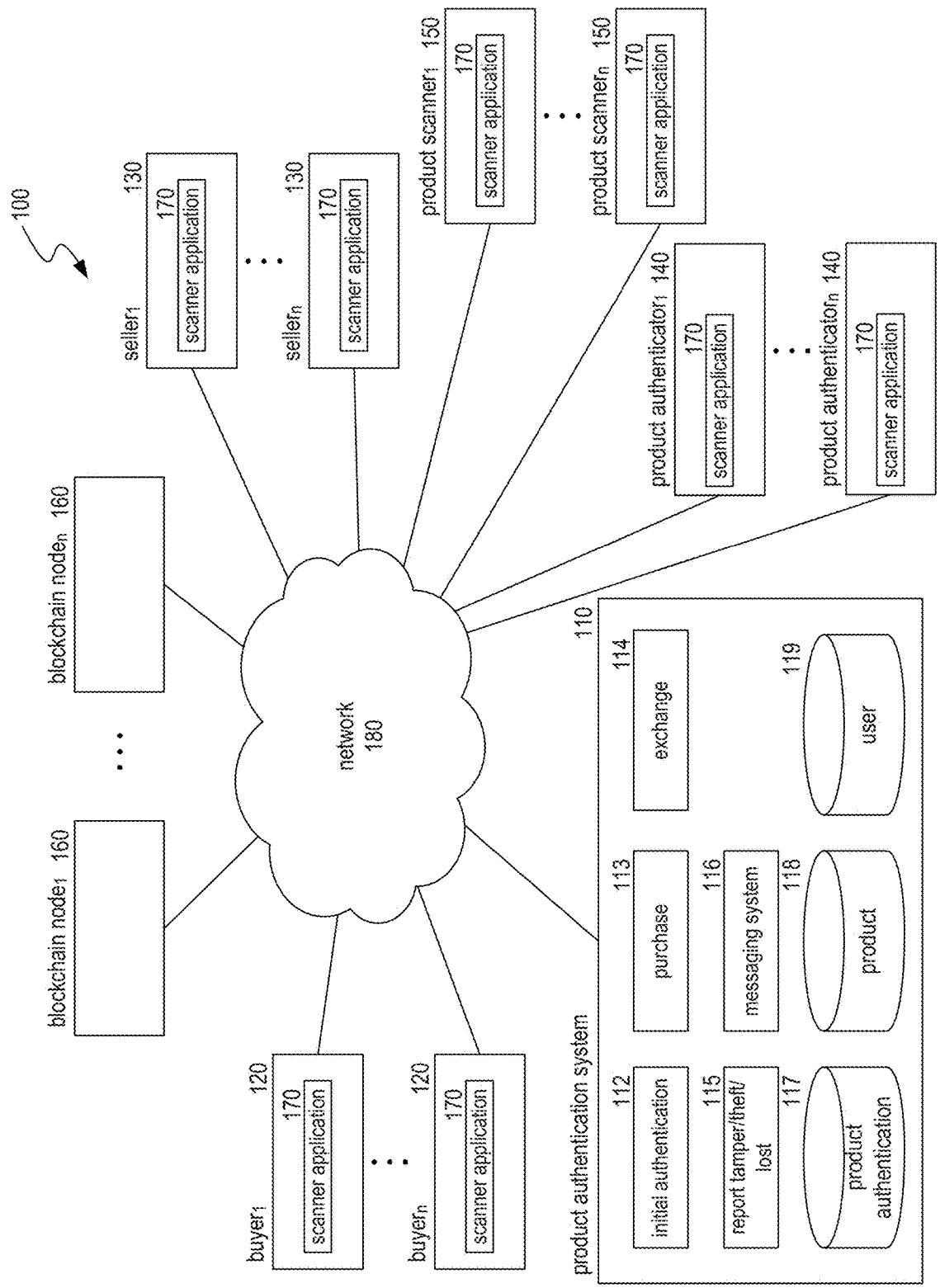
FIG. 1 is a block diagram illustrating an environment in which the product authentication system operates.

The inventors have recognized that conventional approaches to authentication have significant disadvantages. For example, many solutions are very short-sighted, requiring organizations to go through an extensive amount of effort to authenticate a product, often repeatedly, wasting valuable time and resources. Moreover, it can be difficult for consumers to verify that a product purported to be authentic is, in fact, authentic. Once an authenticator authenticates a product, the authentication may only be valid to certain individuals, potentially requiring that a product be re-authenticated as part of a future transaction, thereby requiring duplicated efforts that can waste time and resources. Accordingly, the inventors have determined that a trusted system for transparently and efficiently authenticating goods as they pass between suppliers, manufacturers, distributors, retailers, resellers, and consumers in a supply chain would have great value. Thus, the inventors have conceived a trusted ecosystem that aims to make supply chains more transparent, efficient, and accessible by offering a supply-chain-asa-service platform to enterprises and consumers. A blockchain-based solution, for example, provides efficiency and auditability of transactions, which can improve an organization's ability to comply with regulations. With a continual audit trail that blockchains and other secure, trusted tracking systems provide, real-time compliance checks and settlement become possible, potentially reducing the time and cost associated with traditional processes. These can result in increased efficiency for individual organizations or across an industry. Furthermore, the inventor's proposed solution can be integrated with existing secondary marketplace authentication flows, adding minimal friction to and increased value.

Systems and methods for authenticating products, such as products from original manufacturers and/or resellers, that provide a trusted and reliable mechanism for buyers and sellers to prove the authenticity of a product and for authenticators to establish an authentication that can be relied on during downstream transactions is provided. In some embodiments, a blockchain-based product authentication system is provided that allows entities within a chain of commerce (e.g., suppliers, manufacturers, distributors, retails, consumers, consignors, resellers) to verify the authenticity of items by way of trusted authenticators and trusted audit processes. The product authentication system enables users to rely on product authentications via off-channel sales with the use of cryptography, blockchain, digital assets, and tagging hardware and software such as Near Field Communication (NFC) or other technologies that supports the need to define a digital twin of a physical product, non-fungible tokens (e.g., ERC721 non-fungible tokens), and so on. Thus, the product authentication system provides a product authentication service that reduces the amount of repeated or duplicated effort in authenticating products, thereby saving valuable resources required for performing such activities. The product authentication system provides a more transparent, efficient, and accessible solution that connects businesses and consumers.

In some embodiments, during an initial authentication phase a trusted product authenticator, such as one or more employees of a manufacturer, a certified expert in particular products, etc. is provided a product for examination to determine whether the product is authentic. For example, employees of a manufacturer may be called upon to determine whether a particular item, such as a particular shoe, handbag, article of clothing, collectible item, etc. is one that was originally manufactured by the manufacturer. As another example, a certified expert in verifying the authenticity of one or more products can be called on to authenticate a product. In another example, a trusted reseller of a product may authenticate that the product was sold by that reseller. If the product is deemed to be authentic, a physical tag is attached to the product and the product is given a unique product identifier, each of which is used to track the product as it is sold and re-sold over the course of its life. For example, after a product is authenticated the owner of the product, a retailer, a reseller, the authenticator, or a third party may attach a tag to the product using previously-received tags or a tag provided in response to the authentication. Each time the authenticity of the product is subsequently confirmed or otherwise verified as part of a transaction (e.g., a sale), the authenticator can be remunerated for the past authentication. Furthermore, because the product does not need to be re-authenticated, the product authentication system avoids any duplicate effort required in re-authenticating the product. In some cases, the authenticator may receive free or discounted physical tags and split the remuneration fee with the physical tag provider. Moreover, the authenticator can provide a transaction for recordation in a secure, trusted tracking system, such as a blockchain or hashgraph, indicating that the product has been authenticated by the authenticator on behalf of, for example, the owner of the product. For example, the transaction may include information about the authenticated product signed using a private key of the authenticator. After the transaction is recorded in the secure, trusted tracking system, the authenticity of the product can be verified by subsequent buyers or sellers of the product via a system that is secure and immutable by, for example, analyzing transactions in the secure, trusted tracking system. In this manner, the product authentication system provides a secure and trusted mechanism for parties in the supply chain to record and verify a product's authenticity, thereby reducing the amount of time and effort needed to authenticate a product over the course of its life.

In some embodiments, the product authentication system uses tamper-proof tags or chips, such as NFC Integrated Circuits (ICs) or dual-frequency ICs tags with a Secure Unique NFC (SUN) mechanism that generates a secure unique NFC message authentication each time the tag is scanned or read, for example, for proof of presence, authentication, and ownership. When a product is sold, the seller can scan the tag to provide proof of ownership and proof of presence and then ship the product to the buyer. When the buyer receives the product, the buyer can scan the tag to confirm and claim ownership. Moreover, the transaction between the buyer and the seller can be recorded in a blockchain transaction to provide further proof of the transaction. Each additional ownership transfer of the product can include a fee back to the original authenticator or authenticators paid for by the buyer, the seller, or both (e.g., one dollar, five dollars, ten percent of the cost to purchase the product, twenty percent of the cost to purchase the product, tokens, points, and so on). Thus, the product authentication system expands the authentication services through the lifespan of the authenticated product.

The product authentication system includes several components for managing and verifying authentications, including a product authentication blockchain, tagging hardware and software, a scanner application, and/or cryptography and encryption. In some embodiments, the product authentication blockchain manages digital identities and NFC tags, maintains records of ownership of products, manages fees payments for transfer of ownership and product purchase through smart contracts, manages and authenticates buyers and sellers' identities, manages messaging system to log offers from potential buyers, manages and keeps record of products within a virtual marketplace or selling/trading platform, logs stolen, lost, and/or tampered-with products, etc. The tagging hardware and software can include any type of smart tags and related tagging software, including tags described in U.S. Provisional Patent Application No. 63/125,893, NFC tags with Secure Unique NFC (SUN) mechanisms, such as SMARTRAC's CIRCUS PRO (equipped with NXP's NTAG 424 DNA), etc. The scanner application is a mobile application in communication with the product authentication system that reads NFC tags and serves as an interface between resellers, buyers, sellers, products, and the blockchain. Users of the product authentication system can use the application to authenticate and verify products, transfer ownership of products, connect to buyers and sellers of products through, for example, a messaging component, view products, flag products as stolen, personalized experiences can be displayed through a scan of the tag on the product, and products can be automatically uploaded to the online marketplace through scanning or tapping the NFC tag. The product authentication uses cryptography and encryption for messaging, authentication of products, authentication of buyers, authentication of sellers, transaction settlement on the blockchain, NFC tag communication, and so on.

In some embodiments, the product authentication system relies on NFC tags attached to physical products and associated transactions issued on a blockchain. Similarly, non-physical tags or tokens can be associated with non-physical goods, such as virtual goods and associated transactions issued on the blockchain. Initially, a product's authenticity is confirmed by one or more individuals trained to recognize authenticity, such as employees of a manufacturer, employees of a reseller, a third-party expert, etc. Once the product is authenticated, a uniquely-identifiable NFC tag is attached to, or associated with, the product, an identifier can be created for the product (such as an identity token), and the NFC Tag and identification information are associated in the product authentication system in, for example, a product authentication data store. The identifier created for the product can be a digital cryptographic identifier (e.g., a hash value generated using a secure hashing algorithm), a hash value generated from a description (or partial description) of the product and/or a serial number associated with the product, and so on. Furthermore, information about the product and tag is issued on a blockchain, such as a tag id, current owner, date and time authenticated, authenticator, and so on using a transaction signed using a private key (of a public/private key pair) of the authenticator. In this manner, the product authentication system issues a secure digital authenticity certification using the blockchain to store and manage identities and NFC tags and to link the NFC tags to corresponding products. Furthermore, an authentication flag in the product authentication data store can be updated by the seller for the tag to identify an authentic original product for a corresponding brand. Attaching a tamper-proof tag that certifies authenticity of a product and uniquely and digitally identifies a sold product reduces counterfeits both for tags and products. It also reduces authentication costs as the items are already identified and can be automatically authenticated once they re-enter the market. One of ordinary skill in the art will recognize that physical tags can be attached to products using any number of means for attaching including, for example, adhesives, sewing, stitching, gluing, ironing on, tying, buttoning, fastening, pinning, injecting, embedding, welding, stamping, silk screening, molding, screwing, nailing, and so on.

The product authentication system provides features that make it easier for buyers to learn about products and for sellers to make their product available. By scanning a tag associated with a product a potential buyer can trigger the product authentication system to send relevant information about the product, including virtual experiences involving the product. For example, scanning a physical tag associated with a hand bag using, for example, a scanner application installed on a mobile device computing system may prompt a user to select from among any number of virtual opportunities, such as a live (or pre-recorded) virtual fashion show of the brand, and so on. Alternatively, by scanning a tag associated with a product a seller can be prompted with an easy to use interface for making their product available for sale in a marketplace, such as a form that allows the user to enter a price for the product, a picture of the product, a description of the product, and so on. Once this information is provided, the scanner application can provide this information to the product authentication system so that the product can be made available for purchase.

In some embodiments, the product authentication system provides a closed-ecosystem in which users (e.g., buyers, sellers, authenticators) can exchange within a marketplace provided by the product authentication system. Because the medium of exchange is part of a closed ecosystem, it can be managed by the product authentication system as part of a centralized database. It can be used for to pay for products via an application or interface provided by the product authentication system, such as a mobile app or web-based interface, can be transferred among users, and can be used to pay for activities within the application or interface, such as premium services, exclusive offers (e.g., limited items, raffles for giveaways), etc. Furthermore, in some example, one or more tokens or points distributed in the closed ecosystem can be used to purchase physical tags to attach to products for authentication purposes. For example, a vetted and trusted reseller may be able to purchase physical tags to attach to products they sell. When the tags are used to verify the authenticity of a product, the reseller can be remunerated for having previously authenticated the product. Moreover, because authenticity of the product is verifiable by analyzing transactions stored in a trusted blockchain and without consulting the original authenticator (or another authenticator), authentication efforts need not be duplicated, thereby saving valuable resources of the buyer, the seller, the authenticator, etc.

In some embodiments, the product authentication system can be employed in a digital realm. For example, rather than (or in addition to) linking physical tags to physical products, the product authentication system can use non-fungible tokens associated with items that solely exist as virtual items, such as digital collectables issued by brands, generated from end users activating tags for physical products, and so on. In this manner, the product authentication system can be used to authenticate (and verify the authenticity of) virtual items, rather than relying on physical tags attached to physical items. For example, virtual items, such as virtual shirts, shoes, collectible trading cards, and so on, can be associated with non-fungible tokens and transactions involving those virtual items can be recorded in a secure, trusted tracking system, such as a distributed ledger. These virtual items may be used in various contexts, such as items acquired as part of a game, items worn by an avatar in a game or other virtual environment, and so on. Moreover, the system can act as a wallet or closet for users to store their digital items or collectibles, but they can also buy, sell, and trade the collectibles on a secondary marketplace. In some cases, users can obtain virtual items through the purchase of drop boxes that include any number of virtual items or by purchasing or acquiring a corresponding physical item, such as a shirt for the user to wear and a corresponding virtual shirt for the user's avatar to wear in a game or other virtual environment. Furthermore, the physical item may have an associated tag used for verifying ownership and authenticity of the physical item itself. In some examples, brands or companies generate digital non-fungible tokens that correspond to a specific virtual item and issue these non-fungible tokens as part of a drop box so that the exact virtual item (or items) is not visible at the time of purchase. As such, the user does not know which non-fungible token (and corresponding virtual item) they are purchasing. Furthermore, the product authentication system can provide a marketplace for users to search, buy, and sell their virtual items and to provide profile pages to see (or share) the items in their collection. In some cases, non-fungible tokens may be generated and exchanged or transferred using one or more smart contracts. For example, once a user opens a drop box and receives their virtual items, ownership of the virtual items can be transferred to the user and recorded in the blockchain or other secure, trusted tracking system and the user can then hold on to the virtual item, put the virtual item on sale in a virtual marketplace, transfer the virtual item to another user, and so on. If the item is purchased, the product authentication system and blockchain can be used to both verify the authenticity of the virtual item and verify that it is owned by the seller before it is transferred out of the current owner's closet and into the new owner's possession.

Various embodiments of the disclosed technology will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram illustrating an environment in which the product authentication system operates in accordance with some embodiments of the disclosed technology. In this example, environment 100 is comprised of product authentication system 110, buyer computing systems 120, seller computing systems 130, product authenticator computing systems 140, product scanner computing systems 150, blockchain nodes 160, and network 180. Moreover, various computing systems include a scanner application 170. Product authentication system 110 tracks product authentications and information about authenticated products and is comprised of initial authentication component 112, purchase component 113, exchange component 114, report tamper/theft/lost component 115, messaging system 116, product authentication store 117, product store 118, and user store 119. The product authentication system invokes initial authentication component 112 to authenticate and register newly authenticated products in the product authentication system. The product authentication system invokes purchase component 113 to facilitate a potential buyer through a product search and purchase transaction. Purchase component 113 invokes exchange component 114 to facilitate communication between a potential buyer and a potential seller of a product. The product authentication system invokes report tamper/theft/lost component 115 when a tag is reported as having been tampered with, stolen, or lost. The product authentication system also includes messaging system 116 that allows users (e.g., buyers (and potential buyers), sellers (and potential sellers), product authenticators (and potential product authenticators)) to communicate and exchange information about products and facilitates communication leading to the purchase or transfer of products. Product authentication store 117 stores information about authenticated products, such as tag and product identifiers, information about who authenticated the product and when, information about categories for which the product has been authenticated, whether the product has been tampered with, stolen or lost, and so on. Product store 118 stores general information about products, such as manufacturer, quantity available, cost, description, dimensions, etc. related to products that are available via a marketplace or virtual marketplace provided by the product authentication system or another party. User store 119 stores information about individual users (e.g., buyers, sellers, resellers, authenticators) of the product authentication system, such as a unique identifier corresponding to the user, demographic information, information about past searches and transactions, etc. Buyer computing systems 120 are used by potential buyers to search for and purchase a product. Seller computing systems 130 are used by sellers (including resellers) to process and finalize purchases requests from potential buyers. Product authenticator computing systems 140 are used by product authenticators to record authenticated product information. One of ordinary skill in the art will understand that buyers, sellers, and authenticators need not be exclusive. For example, a buyer of a product may also later sell that product and vice versa. Product scanner computing system 150 represents a mobile device that can be used to scan products as they move, for example, through a supply chain to one or more consumers. Blockchain node computing systems 160 represent the nodes of a blockchain network or any other secure, trusted tracking system. In this example, buyer computing systems 120, seller computing systems 130, product authenticator computing systems 140, product scanner computing systems 150, and blockchain node computing systems 160 can communicate via network 180. One of ordinary skill in the art will recognized that various components described herein may be replicated at various computing systems or operate in a distributed fashion across multiple computing devices and systems. For example, although not shown, the components 112-116 can be installed and executed as part of (or in conjunction with) scanner application 170 at buyer computing systems 120, seller computing systems 130, product authenticator computing systems 140, product scanner computing systems 150, and so on.

The computing devices and systems on which the product authentication system can be implemented can include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices can include keyboards, pointing devices, touchscreens, gesture recognition devices (e.g., for air gestures), thermostats, smart devices, head and eye tracking devices, microphones for voice or speech recognition, and so on. The computing devices and systems can include desktop computers, laptops, tablets, e-readers, personal digital assistants, smartphones, gaming devices, servers, and computer systems such as massively parallel systems. The computing devices and systems can each act as a server or client to other server or client devices. The computing devices and systems can access computer-readable media that includes computer-readable storage media and data transmission media. The computer-readable storage media are tangible storage means that do not include transitory, propagating signals. Examples of computer-readable storage media include memory such as primary memory, cache memory, and secondary memory (e.g., CD, DVD, Blu-Ray) and include other storage means. Moreover, data may be stored in any of a number of data structures and data stores, such as a databases, files, lists, emails, distributed data stores, storage clouds, etc. The computer-readable storage media can have recorded upon or can be encoded with computer-executable instructions or logic that implements the product authentication system, such as a component comprising computer-executable instructions stored in one or more memories for execution by one or more processors. In addition, the stored information can be encrypted. The data transmission media are used for transmitting data via transitory, propagating signals or carrier waves (e.g., electromagnetism) via a wired or wireless connection. In addition, the transmitted information can be encrypted. In some cases, the product authentication system can transmit various alerts to a user based on a transmission schedule, such as an alert to inform the user that a goal for a given period has or has not been met or that one or more changes to a constraint can enable the system to further optimize a goal. Furthermore, the product authentication system can transmit an alert over a wireless communication channel to a wireless device associated with a remote user or a computer of the remote user based upon a destination address associated with the user and a transmission schedule in order to, for example, periodically recommend authenticated products. In some cases, such an alert can activate a listings viewer application to cause the alert to display, on a remote user computer and to enable a connection via, a universal resource locator (URL), to a data source over the internet, for example, when the wireless device is locally connected to the remote user computer and the remote user computer comes online. Various communications links can be used, such as the Internet, a local area network, a wide area network, a point-to-point dial-up connection, a cell phone network, and so on for connecting the computing systems and devices to other computing systems and devices to send and/or receive data, such as via the Internet or another network and its networking hardware, such as switches, routers, repeaters, electrical cables and optical fibers, light emitters and receivers, radio transmitters and receivers, and the like. While computing systems and devices configured as described above are typically used to support the operation of the product authentication system, those skilled in the art will appreciate that the product authentication system can be implemented using devices of various types and configurations, and having various components.

The product authentication system can be described in the general context of computer-executable instructions, such as program modules and components, executed by one or more computers, processors, or other devices, including single-board computers and on-demand cloud computing platforms. Generally, program modules or components include routines, programs, objects, data structures, and so on that perform particular tasks or implement particular data types. Typically, the functionality of the program modules can be combined or distributed as desired in various embodiments. Aspects of the product authentication system can be implemented in hardware using, for example, an application-specific integrated circuit ("ASIC").

Figure 2:
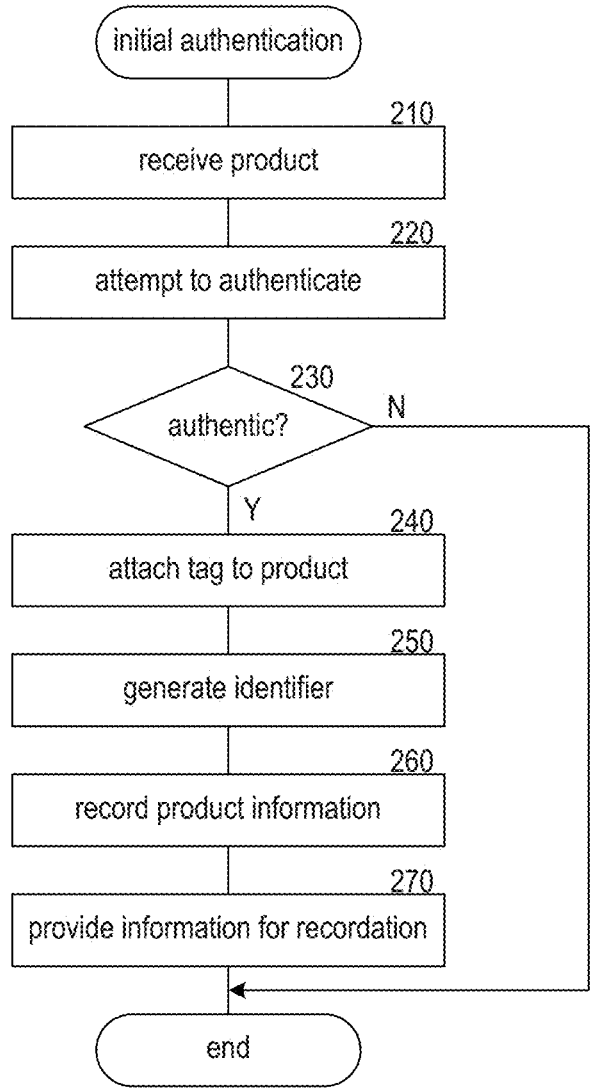
FIG. 2 is a flow diagram illustrating the steps of an initial authentication component.

FIG. 2 is a flow diagram illustrating the steps of an initial authentication component in accordance with some embodiments of the disclosed technology. The steps facilitate authentication of a product in one or more categories and register the authenticated product with the product authentication system. In block 210, the product is sent to an authenticator for authentication. In block 220, the authenticator attempts to authenticate the product. For example, the authenticator may determine that the product was manufactured by a particular manufacturer, is composed of genuine materials (e.g., genuine leather), is certified by a particular certification authority (e.g., a sustainability certification), and so on. In decision block 230, if the authenticator verifies that the product is authentic, then the component continues at block 240, else the component completes. In block 240, a physical tag is attached to the product, such as a uniquely identifiable Near Field Communication (NFC) tag. In some cases, the physical tag may be attached by the authenticator. In some cases, the product may be shipped back to the owner or a third-party responsible for attaching the physical tags. In block 250, the component generates an identifier for the product by, for example, generating an identity token for the product, generating a non-fungible token for the product using, for example, the ERC-721 or ERC-1155 standards, applying a hash function (e.g., SHA-256, RIPEMD-160, etc.) to a) the unique identifier associated with the tag, b) a serial number and/or other description information pertaining to the product, including general information (e.g., a stock keeping unit (SKU) code, product type (including, for example, clothing, jacket, shoe, tool, bicycle, recreation, non-perishable, book, collectible, etc.), images of the product, a release date, and so on) and information specific to the product (e.g., information unique to the product, an identifier associated with an owner of the product, condition information, size and/or weight information, manufacture date/time/location, and so on), c) to information about the when the product was authenticated and who authenticated the product, d) to information about who requested the authentication, and so on or any combination thereof. In block 260, the component records product authentication information in the product authentication store, such as unique identifier associated with the tag attached to the product, the identifier generated for the product, information about the who authenticated the product and when the product was authenticated, and so on. In block 270, the component provides a transaction for recordation in a blockchain or other secure, trusted tracking system, such as a transaction that associates the owner of the product with the unique identifier associated with the tag attached to the product and the generated identifier and signed using a private key (of a public/private key pair) associated with the authenticator. Recording the transaction in the secure, trusted tracking system establishes provenance of the product, and the identifier can be used in transactions (e.g., buying, selling, insuring) to establish a full audit trail of the transactions. One of ordinary skill in the art will recognize that the transaction provided for recordation may include additional information related to the transaction and that various steps performed during the process can be completed using one or more smart contracts.

FIG. 3 is a data diagram illustrating a product authentication store in accordance with some embodiments of the disclosed technology. In this example, table 300 includes rows 340, each row corresponding to a different tagged product. Column 310 represents the identifier associated with the product, such as an identity token. Column 320 represents the unique identifier associated with the tag attached to the product. Column 325 stores an indication of the current owner of the authenticated product associated with the corresponding tag. Column 330 stores an indication of whether the product has been reported as having been tampered with, stolen, or lost. In this example, a value of True indicates that the product has been tampered with, stolen or lost, while a value of False indicates that the product has not been tampered with, stolen, or lost. Each of columns 331 store the date on which the corresponding authentication was performed. Each of columns 332 store a unique identifier for the authenticator that performed the corresponding authentication. Columns 331 and 332 represent various authentications for a product. For example, the $date_1$ column may indicate that a corresponding product has been authenticated as having been manufactured by a specific manufacture and that the authentication was performed on a particular date while the $date_n$ column indicates that the corresponding product is manufactured with particular materials, such as materials harvested using a sustainable process and that the authentication was performed on a particular date. For example, the top row indicates that the product with the product ID AF214 and tag ID C213D was authenticated in one category on Jan. 2, 2020 by the manufacturer and in a second category on Mar. 2, 2020 by a third party (e.g., a product or certification expert). One skilled in the art will appreciate that while FIG. 3 provides an illustration that is easily comprehensible by a human reader, the actual information may be stored using different data, data structures, and data organizations. For example, the product authentication system may require one authentication per tag. As another example, the date field may include more precise information, such as time and the product ID and tag ID values may be consistent with various encryption and cryptographic standards and algorithms (e.g., Secure Hash Algorithm 2 (such as SHA-224, SHA-256, SHA-512, and so on), the Advanced Encryption Standard (such as AES-128, AES-256, and so on), etc. As another example, the product authentication store may also include information about when a product was reported as being tampered with, stolen, or lost, who reported the product as having been tampered with, stolen, or lost, and so on. As another example, the product authentication store may include, for each authenticated product, a history of transactions involving that product or a list of previous owner of that product.

Figure 4:
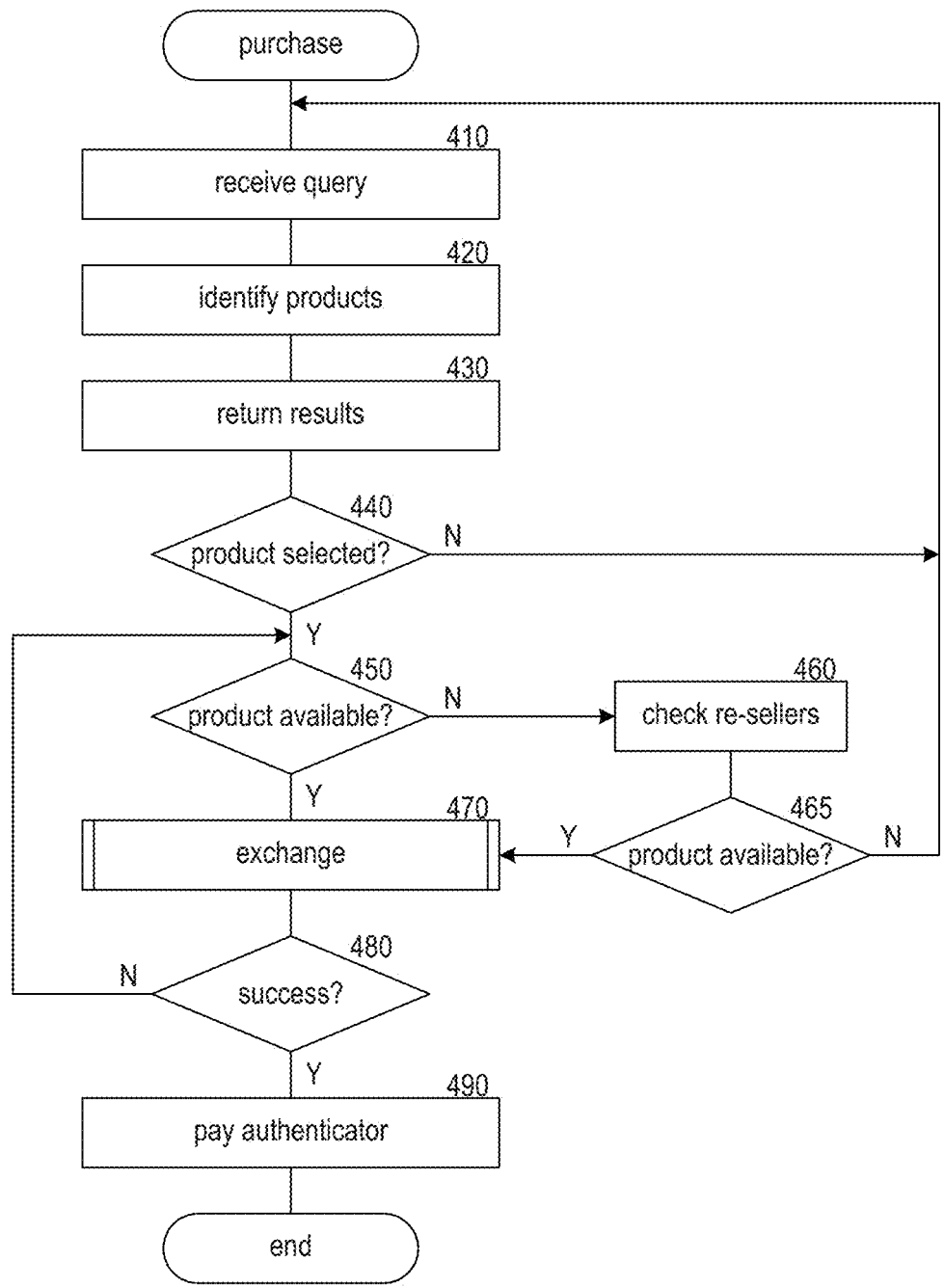
FIG. 4 is a flow diagram illustrating the processing of a purchase component.

FIG. 4 is a flow diagram illustrating the processing of a purchase component in accordance with some embodiments of the disclosed technology. In this example, the product authentication system invokes the purchase component to facilitate a potential buyer's search for and purchase of an authenticated product. In block 410, the component receives a query from the buyer describing the product that the user wants to buy. In block 420, the component performs a search for products that are consistent with the query, such as products recorded in a product store. In block 430, the component returns the results to the potential buyer. In decision block 440, if the potential buyer selects a product, the component continues at block 450, else the component loops back to block 410 so that the user can perform another search. In block 450, if the product is available from current inventory of an initial seller, such as a manufacturer or retailer, then the component continues at block 470 to invoke an exchange component to facilitate an exchange between the initial seller and the potential buyer, else the component continues at block 460. In block 460, the component checks to see if the product is available from any resellers. In decision block 465, if the product is available from a reseller then then the component continues at block 470 to invoke an exchange component to facilitate an exchange between the seller (or reseller) and the potential buyer, else the component loops back to block 410 so that the user can perform another search. In some examples, the potential buyer is presented with a list of resellers that have the selected product available and is able to select one or more preferred resellers. In decision block 480, if the exchange was successful, then the component continues at block 490, else the component loops back to decision block 450 to check whether the product is available from current inventory of an initial seller. In block 490, the component pays any authenticators that authenticated the product and then completes. In some examples, the component may pay the authenticators a fixed value or percentage of the transaction amount (e.g., standard currency or cryptocurrency) each time the authenticated product is sold. In other examples, the authenticators may be paid for each sale until they have received a predetermined amount, or until the authenticated product has been sold a predetermined number of times, or until a predetermined date and time, etc.

Figure 5:
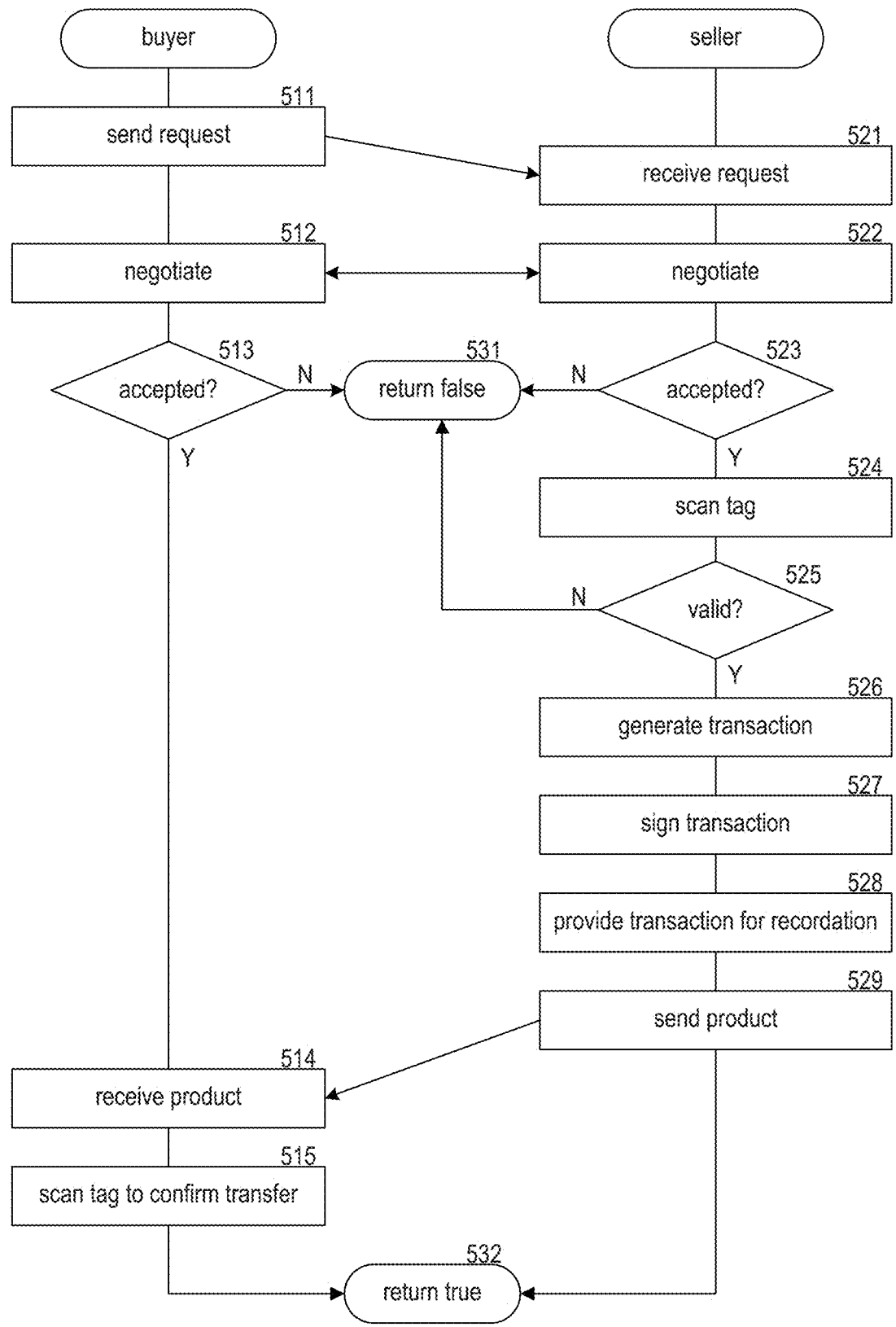
FIG. 5 is a flow diagram illustrating steps of an exchange component.

FIG. 5 is a flow diagram illustrating steps of an exchange component in accordance with some embodiments of the disclosed technology. The exchange component facilitates a transaction between a buyer and a seller. In block 511, the potential buyer sends a request for the product to the potential seller (e.g., an initial or original seller or reseller). In some examples, the request includes identification information for the potential buyer while in other examples the request can be anonymous. In this case, the potential buyer can provide identification information, for example, after the buyer and the seller have agree on terms. In block 521, the seller receives the request. In blocks 512 and 522 the potential buyer and seller negotiate over terms of the purchase, such as price, shipping, insurance, payment processing, timelines, etc. In some cases, the potential buyer and/or seller may have fixed terms and be unwilling to negotiate, in other cases the negotiate term may be prolonged. In decision blocks 513 and 523, if terms of the exchange are accepted, then the seller continues at block 524, else the component returns a value of false at block 531, indicating that the exchange was not successful. For example, the component may receive a message indication acceptance of an offer from the potential buyer or the seller. In block 524, the seller logs in to the scanner application to prove their identity (if they have not done so already) and scans the tag attached to the product to, for example, provide proof of ownership (verifiable via a secure, trusted tracking system, such as a blockchain, and/or the product authentication store) and proof of presence. In decision block 525, if the seller's scanner application confirms that the product's authentication is valid (by, for example, checking transactions in a blockchain or a product authentication data store) and that the product is owned by the seller, processing continues at block 526, else the component returns false. In block 526, the scanner application generates a transaction indicating that the seller is selling the tagged product to the potential buyer, the transaction including identification information for the product, the seller, and the buyer, such as a unique identifier associated with each, a public key associated with each, etc. and information about the transaction, such as the date and time of the transaction, the cost, an indication that the transaction is a transfer of ownership, etc. Accordingly, the transaction provides evidence that the buyer is now the current owner. In block 527, the seller signs the transaction with the seller's private key (of a public/private key pair) by, for example, selecting an option to sign in the scanner application. In block 528, the seller's scanner application provides the signed transaction for recordation in the blockchain or other secure, trusted tracking system. In this manner, the purchase history of the authenticated product can be recorded in the blockchain, thereby providing a safe and trusted mechanism for buyers and sellers to determine whether a particular user owns an authenticated product. In block 529, the seller sends the authenticated product to the buyer or engages with a third-party to have the authenticated product to the buyer. In block 514, the buyer receives the product. In block 515, the buyer logs in to the scanner application to prove their identity and scans the tag attached to the product to confirm transfer of the product. In some examples, buyer's scanner application also finalizes payment to the seller. In some cases, the seller may require payment (or partial payment) prior to sending the authenticated product to the buyer. In block 532, the component returns a value of true, indicating that the exchange was successful. One of ordinary skill in the art will recognize that the transaction provided for recordation may include additional information related to the transaction and that various steps performed during the process can be completed using one or more smart contracts.

Figure 6:
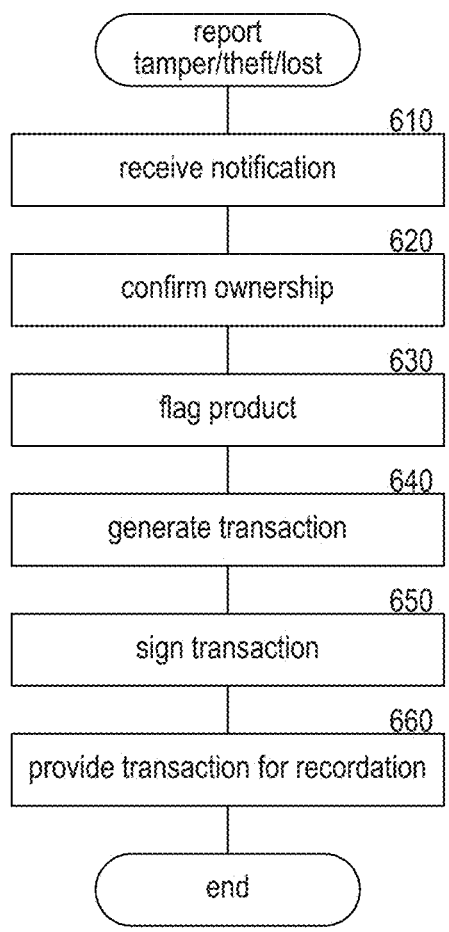
FIG. 6 is a flow diagram illustrating the processing of a reported tamper/theft/loss component.

FIG. 6 is a flow diagram illustrating the processing of a report tamper/theft/lost component in accordance with some embodiments of the disclosed technology. The report tamper/theft/stolen component is invoked by, for example, a scanner application, to report that an authenticated product has been tampered with, stolen, or lost. In block 610, the component receives, from a user, a notification indicating that the tag has been tampered with or that the authenticated product has been stolen or lost. In block 620, the component confirms ownership of the authenticated product via the blockchain and/or the product authentication store by comparing the user currently logged in to the scanner application to the recorded ownership information and/or buy confirming that the transaction is signed using the owner's private key (of a public/private key pair). In block 630, the component flags that product by, for example, setting the authentic values associated with the tag in the product authentication store to false or setting a tamper/stolen flag (not shown) to true. In block 640, the component generates a transaction indicating that the current owner has indicated that the authenticated product has been tampered with, stolen, or lost. In block 650, the component signs the transaction with the user's private key (of a public/private key pair). In block 660, the component provides the transaction for recordation in the blockchain and then completes. The product authentication system can also include a process to report a product as found. For example, if a product owner subsequently recovers a lost or stolen item, the product owner can submit a transaction (signed using the owner's private key (of a public/private key pair) for recordation in the blockchain and the product authentication system can set the tampered with/lost/stolen flag to false in a product authentication store. One of ordinary skill in the art will recognize that the transaction provided for recordation may include additional information related to the transaction and that various steps performed during the process can be completed using one or more smart contracts.

Figure 7:
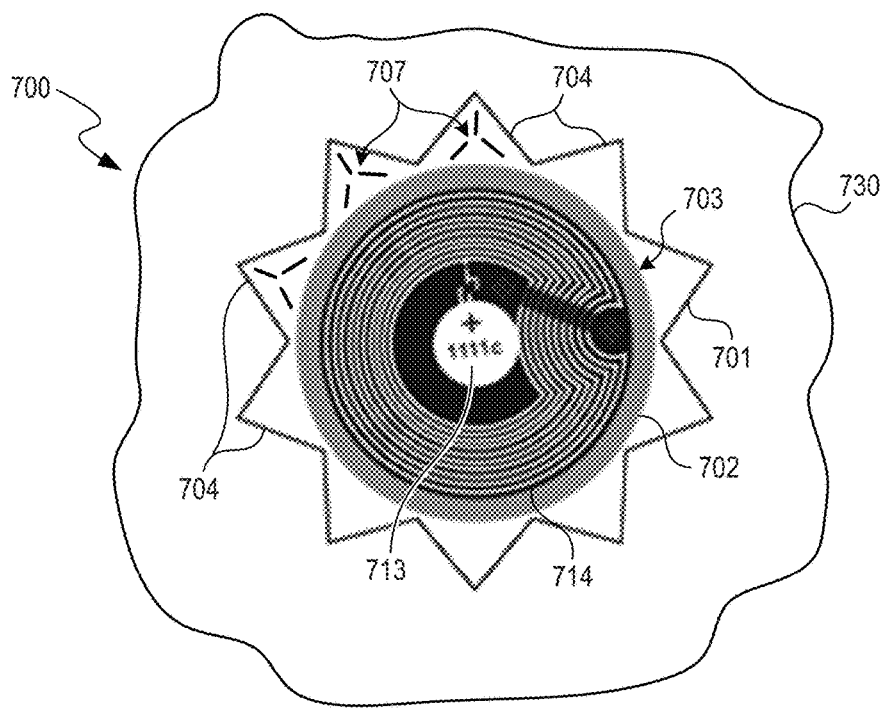
FIG. 7 is a partially schematic, top view of a representative identification tag placed on an object.
Figure 8:
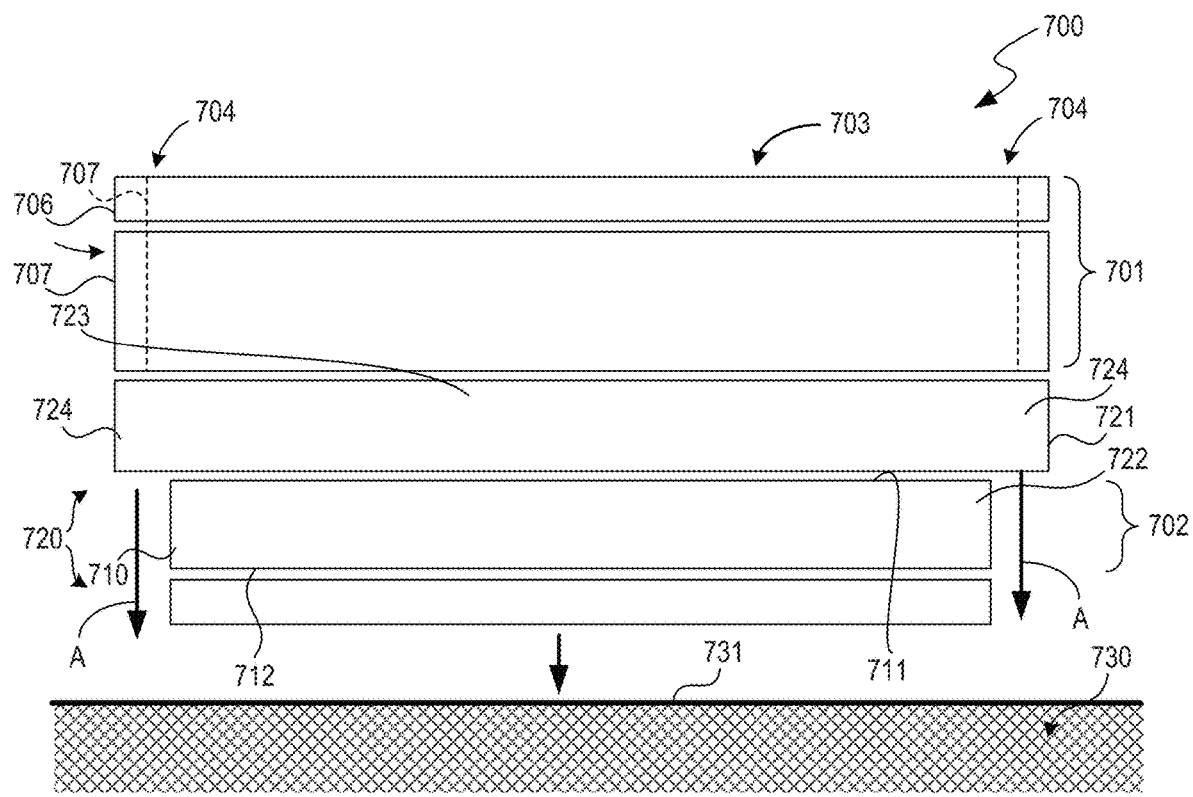
FIG. 8 is a partially schematic, cross-sectional illustration of an embodiment of the tag described with reference to FIG. 7.

FIG. 7 is a partially schematic, top view of a representative identification tag 700 placed on an object 730, and configured in accordance with some embodiments of the disclosed technology. FIG. 8 is a partially schematic, cross-sectional illustration of the tag shown in FIG. 7. Referring first to FIG. 7, the tag 700 is formed from multiple layers, for example, a first layer 701, which overlays a second layer 702 beneath it. The second layer 702 (sometimes referred to as an inlay) includes near field communication (NFC) elements that store information in the tag 700, corresponding to the object 730 to which the tag 700 is affixed. Accordingly, the second layer 702 can include NFC circuitry 713 coupled to a corresponding antenna 714. The NFC circuitry 713 can include digital storage elements that store information, for example, identification information, website URLs, and/or other information, including authentication codes, that can be used to identify the object 730, and/or the source of the object 730, and/or otherwise provide an authentication mechanism by which parties can confirm the authenticity of the object 730.

The first layer 701 can include a central portion 703 positioned over the second layer 702, and one or more projections 704 that extend outwardly from the central portion 703. As will be described further below with reference to FIG. 8, one or more adhesives attached to the downwardly-facing surface of the second layer 702, and the downwardly-facing surface of the projections 704 extending outwardly from the central portion 703, can adhere the tag 700 to the object 730. The projections 704 can make it difficult or impossible to remove the tag 700, as a unit, from the object 730. Accordingly, the projections 704, alone or together with other elements of the present technology, can prevent one from defeating the authenticity function performed by the tag 700 without destroying the tag 700. In particular embodiments, one or more of the projections 704 and/or other elements of the tag 700 can include perforations 707 that can further thwart an attempt to remove the tag 700 from the object and place it on another object, again, defeating the authenticity function of the tag 700. For purposes of illustration, three projections 704 are shown in FIG. 7 as being perforated, but this number can be greater or smaller, depending upon the application.

FIG. 8 is a partially schematic, cross-sectional illustration of an embodiment of the tag 700 described above with reference to FIG. 7. As shown in FIG. 8, the first layer 701 as a whole overlays the second layer 702, and is attached to the second layer 702. The first layer 701 can include one or more sublayers 705, for example, an overlay 706, and a print layer 708. The print layer 708 can be formed from a plastic (e.g., polyethylene terephthalate or PET), or paper, or another suitable material. In a representative embodiment, the print layer 708 has printing (e.g., text and/or graphics) applied to its upwardly facing surface. The overlay 706 can provide protection for the print layer 708. In some embodiments, the overlay 706 can be formed from a plastic or other suitable protective material, and can be transparent, so as to allow the printing on the print layer 708 to be visible from above.

The second layer 702 can include the NFC circuitry 713 and antenna 714 described above with reference to FIG. 7. These components are commercially available, and can be configured to comply with one or more suitable NFC protocols or tag-types (e.g., protocols 213 and/or 424). The foregoing and/or other protocols provide manufacturers with guidance on establishing uniform content, memory capacity, and/or cryptographic attributes of the tag 700.

The tag 700 further includes multiple adhesives to adhere the foregoing components to each other, and to adhere the tag 700 to the object 730, in a manner that resists tampering with the tag 700 after it has been attached. For example, the tag 700 can include a first adhesive 721 that attaches the first layer 701 to the second layer 702. Accordingly, the first adhesive 721 can include an adhesive central portion 723 that is aligned with the second layer 702, and adhesive projections 724 that extend outwardly from the adhesive central portion 723 and from the second layer 702. The second layer 702 has a first (e.g., upwardly facing) surface 711, and a second (e.g., downwardly facing) surface 712; the first surface 711 is adjacent to the first adhesive 721, and the second surface 712 is adjacent to the second adhesive 722. The second adhesive 722 is positioned to attach the second layer 702 to the object 730. Additionally, because the second layer 702 and the second adhesive 722 are quite thin, the adhesive projections 724 of the first adhesive 721 can conform to the slight thickness of the second layer 702, and contact a surface 731 of the object 730, as indicated by arrows A, thus providing additional adhesion between the tag 700 and the object 730.

In a particular embodiment shown in FIG. 8, the first adhesive 721 is weaker than the second adhesive 722. For example, the first adhesive 721, when subjected to a peeling force, generally separates more readily than does the second adhesive 722. As a result, if one attempts to remove the tag 700, as a whole, from the object 730 (e.g., to place it on a non-authenticated object), the first adhesive 721 tends to fail before the second adhesive 721, causing the first layer 701 to peel away from the second layer 702. In addition, if the first layer 701 is peeled away from the second layer 702, the adhesive 721 can take with it at least some elements of the second layer 702, effectively destroying the NFC circuitry 713 and/or the antenna 714 shown in FIG. 7. As a result, the construction of the tag 700 provides a tamper-evident function and/or a destruction function which impedes or eliminates the ability for a user to remove the tag 700 from the object 730 to which it was originally attached, and re-attach the tag to another (e.g., inauthentic) object.

Referring now to FIGS. 7 and 8 together, the projections 707 further confound the users' ability to remove the tag 700, intact, from the object 730. In particular, a user attempting to pry the tag 700 from the object 730 will need to pry away multiple projections 704 simultaneously, to avoid destroying the tag 700. The presence of the projections 704 makes this task difficult, if not impossible. In addition, the perforations 707 can discourage or prevent a user from separating the tag 700, intact, from its object. Accordingly, embodiments of the present technology can provide a more secure connection between an authenticating tag 700 and the object 730 to which it is attached.

As described above, elements of the tag 700 can be relatively thin. For example, referring to FIG. 8, the overlay 706 can have the thickness of about 0.04 millimeters. The print layer 708 can have a thickness of about 0.125 millimeters. The first adhesive 721 can have a thickness of about 0.08 millimeters. The second layer or inlay 702 can have a thickness of about 0.08 millimeters, and the second adhesive 722 can have a thickness of about 0.04 millimeters. The foregoing dimensions are representative; it will be understood that these dimensions may have different values, depending on factors that include the size of the tag 700 and/or the nature of the object 730 to which the tag is attached. Representative tag elements, including the inlays and adhesives described above, are available from Cellotape (Cellotape.com), Tagstand (tagstand.com), etc.

The adhesives described above, in addition to having differing adhesive strengths, can have different properties depending upon the object 730 to which the tag 700 is attached. For example, if the surface 731 of the object 730 to which the object is attached includes a fabric, the second adhesive 722 (and/or the first adhesive 721) can be specifically selected for strong adhesion to a fabric. If the first surface 731 includes leather, wood, metal, and/or another composition, the adhesives 721, 722 can again be selected in a matter tailored to the characteristics of this surface.

The object 730 can be or can include any of a wide variety of objects (typically high-value and/or luxury goods) for which authentication can be important. For example, the object 730 can include a shoe, for example, a high-end athletic shoe. The shoe can include a sole, an upper, and a tongue. The upper of the shoe can have an inner side wall and a toe portion, among other portions. Each portion can include an outwardly-facing outer surface and an inwardly-facing inner surface. In embodiments in accordance with the disclosed technology, the tag 700 can be placed on surfaces of the shoe that are both difficult to access (therefore making it difficult to remove the tag 700 intact), and less subject to wear-and-tear than are other portions of the shoe. For example, the tag 700 can be placed on the shoe inner surface at the toe portion, which is both difficult to reach without damaging the tag 700 (and/or the shoe), and is also not subject to a significant amount of wear-and-tear. In other embodiments, the tag 700 can be placed on the inner surface at the inner sidewall, and/or beneath an inner surface of the sole, and/or at an inner surface of the tongue. In any of these embodiments, the position of the tag 700, by itself, may be sufficient to discourage tampering with the tag 700. In other embodiments, the tag 700 can include the tamper-resistant elements described above with reference to FIGS. 7 and 8, in particular, the multiple adhesives with differing adhesive strengths, and/or the projections.

In particular embodiments described above, the tag 700 is placed on an inner surface of the shoe, but is not integrally manufactured with the fabric (or other element) of the shoe. Accordingly, the tag can be used to authenticate a post-production product. A further advantage of this arrangement is that the tag will not interfere with the overall aesthetic value of the product, by virtue of typically being visually inaccessible.

Prior to attaching the tag 700, the tag can be carried by a suitable non-stick peel layer. Once the tag 700 has been affixed to the shoe or other object, the tag can be interrogated to confirm the authenticity of the object. For example, a user can use a mobile device 760 having an appropriate scanner application to interrogate the tag 700 and confirm the authenticity of the shoe. In representative embodiments, the product scanner 150 is positioned at a range of about 1 inch from the shoe during the interrogation process. The characteristics of the NFC circuitry 713 and antenna 714 (FIG. 7) are such that the tag 700 can be readily interrogated despite the intervening layer of fabric (or other material) of the shoe and/or a protective covering on the product scanner 150. Representative providers of suitable authentication services include LegitGrails (legitgrails.com) and LEGIT APP (legitapp.com).

In an embodiment described above with reference to FIGS. 7 and 8, the tag 700 includes ten projections 704. One of ordinary skill in the art will recognize that tags can be prepared in any number of shapes and sizes, including tags with varying numbers of projections extending outwardly from corresponding central portions, tags with projections positioned to form a square, rectangular, and/or diamond shape, tags with a generally triangular shape, a generally semi-circular shape, a generally crescent shape, an arrow-head shape, an "x" or "plus" configuration, tags with an arbitrary number of projections arranged in an arbitrary configuration, the shape of a letter, word, image, logo, etc.

From the foregoing, it will be appreciated that specific embodiments of the present technology have been described herein for purposes of illustration, but that various modifications may be made without deviating from the technology. For example, although described as using a blockchain above, one of ordinary skill in the art will recognize that the product authentication system can be implemented using any secure and trusted tracking system, such as known distributed ledger systems and blockchain systems, including Ethereum, described at https://github.com/ethereum/wiki/wiki/WhitePaper and in Ethereum white paper by Vitalik Buterin published in 2013, each of which is herein incorporated by reference, Quorum, described at https://raw.githubusercontent.com/jpmorganchase/quorum-docs/master/Quorum %20Whitepaper %20v0.1.pdf, committed on Nov. 22, 2016, which is herein incorporated by reference in its entirety, Hedera, described in Hedera: A Public Hashgraph Network & Governing Council (last updated Aug. 15, 2020), which is herein incorporated by reference in its entirety, and so on. Moreover, in some embodiments, the product authentication system can rely on multiple blockchains such that each node in the blockchain system is a "dual-connection" node connected to a public blockchain, such as Ethereum, and a permissioned blockchain, such as Quorum. Thus, recordation of an exchange between two parties may require multiple blockchain transactions. As another example, the adhesives described above can have different sources and/or different compositions than those expressly disclosed herein, while still including the differential adhesive strengths described above. The shapes of the tags can be different than those expressly shown and described above. The tags can have different layers than those expressly described above, depending on the particular use for the tag. Representative tags can fail at the adhesive layers, and/or via other failure modes, e.g., by tearing at the first layer 701, whether or not the first layer 701 is perforated. While the tags were described above as being applied to shoes, in other embodiments, the tags can be applied to handbags, street clothing, and/or other goods, typically but not necessarily high-end or luxury goods. The tags can be used in the context of secondary market resellers, as described in connection with several embodiments above, and/or can have applications in other markets, e.g., collectors and/or collector markets.

Unless the context clearly requires otherwise, throughout the description and the claims, the words "comprising," "comprise," and the like are to be construed in an inclusive sense, as opposed to an exclusive or exhaustive sense; that is to say, in the sense of "including, but not limited to." As used herein, the terms "coupled," "connected," or any variant thereof, mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or" in reference to a list of two or more items, covers all of the following interpretations of the word: any of the items in the list all of the items in the list, and any combination of the items in the list.

The above Detailed Description of examples of the disclosed subject matter is not intended to be exhaustive or to limit the disclosed subject matter to the precise form disclosed above. While specific examples for the disclosed subject matter are described above for illustrative purposes, various equivalent modifications are possible within the scope of the disclosed subject matter, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative combinations or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The disclosure provided herein can be applied to other systems, and is not limited to the system described herein. The features and acts of various examples included herein can be combined to provide further implementations of the disclosed subject matter. Some alternative implementations of the disclosed subject matter can include not only additional elements to those implementations noted above, but also can include fewer elements.

Any patents and applications and other references noted herein, including any that can be listed in accompanying filing papers, are incorporated herein by reference in their entireties. Aspects of the disclosed subject matter can be changed, if necessary, to employ the systems, functions, components, and concepts of the various references described herein to provide yet further implementations of the disclosed subject matter.

These and other changes can be made in light of the above Detailed Description. While the above disclosure includes certain examples of the disclosed subject matter, along with the best mode contemplated, the disclosed subject matter can be practiced in any number of ways. Details of the product authentication system can vary considerably in the specific implementation, while still being encompassed by this disclosure. Terminology used when describing certain features or aspects of the disclosed subject matter does not imply that the terminology is being redefined herein to be restricted to any specific characteristics, features, or aspects of the disclosed subject matter with which that terminology is associated. In general, the terms used in the following claims should not be construed to limit the disclosed subject matter to specific examples disclosed herein, unless the above Detailed Description section explicitly defines such terms. The scope of the disclosed subject matter encompasses not only the disclosed examples, but also all equivalent ways of practicing or implementing the disclosed subject matter under the claims.

To reduce the number of claims, certain aspects of the disclosed subject matter are presented below in certain claim forms, but the applicant contemplates the various aspects of the disclosed subject matter in any number of claim forms. For example, aspects of the disclosed subject matter can be embodied as a means-plus-function claim, or in other forms, such as being embodied in a computer-readable medium. (Any claims intended to be treated under 35 U.S.C. § 112(f) will begin with the words "means for," but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

We claim:

1. A method performed by one or more computing systems, the method comprising:
   receiving an indication that a first product is authentic,
      wherein the first product has a first owner,
      wherein the first owner is associated with a unique identifier, and
      wherein the indication that the first product is authentic is received from at least one employee of a manufacturer of the first product or a reseller of the first product;
   receiving an indication that a physical tag has been attached to the first product, the physical tag being associated with the unique identifier;

generating an identifier for the first product based on a product type, at least one image of the first product, a release date, the unique identifier associated with the first owner, condition information, and weight information;

recording an association between the unique identifier associated with the physical tag and the generated identifier;

generating a transaction that includes the unique identifier associated with the first owner and the physical tag, the transaction specifying that the first owner owns the first product; and providing the generated transaction for recordation in a secure tracking system.

2. The method of claim 1, further comprising:

receiving from a buyer an indication of the generated transaction;

sending to the first owner an offer message offering to purchase the first product for an offer amount;

receiving from the first owner an accept message;

receiving from the first owner a scan of the physical tag, the scan verifying the authenticity of the first product;

providing, for recordation in the secure tracking system, a transaction to transfer ownership of the first product to the buyer as a new owner of the first product;

receiving from the new owner of the first product an acceptance message; and providing, for recordation in the secure tracking system, a transaction indicating acceptance of the first product by the new owner of the first product.

3. The method of claim 2, further comprising:

receiving, from the new owner of the first product, a scan of the physical tag confirming transfer of ownership of the first product.

4. The method of claim 3, further comprising:

in response to receiving, from the new owner, the scan of the physical tag confirming transfer of ownership of the first product, identifying an authenticator responsible for authenticating the first product, and determining a value to provide to the identified authenticator.

5. The method of claim 4, wherein the determined value to provide to the identified authenticator is determined as a percentage of the offer amount.

6. The method of claim 1, wherein the physical tag is a near field communication tag.

7. The method of claim 1, wherein generating the identifier for the first product comprises generating a digital cryptographic identifier for the first product.

8. The method of claim 1, wherein the secure tracking system is a blockchain system and wherein providing, for recordation in the secure tracking system, the transaction to transfer ownership of the first product to the buyer as a new owner of the first product includes providing the transactions signed using a private key of a public/private key pair associated with the first owner.

9. A non-transitory computer-readable medium storing instructions that, when executed by a computing system having a memory and a processor, cause the computing system to perform a method comprising:

receiving from a buyer an indication of a transaction recorded in a secure tracking system relating to an authenticated product of interest, the transaction identifying a current owner of the authenticated product of interest, the authenticated product of interest having a tagging hardware, wherein the transaction includes a unique identifier associated with the buyer and the tagging hardware;

generating an identifier for the authenticated product of interest based on a product type, at least one image, a release date, the unique identifier associated with the buyer, condition information, and weight information;

recording an association between the unique identifier associated with the tagging hardware and the generated identifier;

sending to the current owner an offer message offering to purchase the authenticated product of interest for an offer amount;

receiving from the current owner an accept message;

receiving from the current owner a scan of the tagging hardware, the scan verifying the authenticity of the authenticated product of interest;

providing, for recordation in the secure tracking system, a transaction to transfer ownership of the authenticated product of interest to the purchaser as a new owner of the authenticated product of interest;

receiving from the purchaser an acceptance message;

providing, for recordation in the secure tracking system, a transaction indicating acceptance of the authenticated product of interest by the new owner of the authenticated product of interest; and mirroring the transaction indicating acceptance of the authenticated product of interest by the new owner of the authenticated product of interest in a product authentication store at least in part by updating an owner field in the product authentication store to include a unique identifier associated with the new owner.

10. The non-transitory computer-readable medium of claim 9, the method further comprising:

receiving, from the new owner, a scan of the tagging hardware confirming transfer of ownership of the authenticated product of interest.

11. The non-transitory computer-readable medium of claim 10, the method further comprising:

in response to receiving, from the new owner, the scan of the tagging hardware confirming transfer of ownership of the authenticated product of interest, identifying an authenticator responsible for authenticating the authenticated product of interest, and determining a value to provide to the identified authenticator.

12. The non-transitory computer-readable medium of claim 11, wherein the determined value to provide to the identified authenticator is a fixed fee.

13. The non-transitory computer-readable medium of claim 9, wherein the tagging hardware is a near field communication tag.

14. The non-transitory computer-readable medium of claim 9, the method further comprising:

for each subsequent transaction involving a sale of the authenticated product of interest, determining a value to provide to an authenticator responsible for authenticating the authenticated product of interest, and providing the determined value to the authenticator responsible for authenticating the authenticated product of interest.

15. A product authentication computing system comprising:

at least one memory;

at least one processor;

a component configured to receive an indication that a non-fungible token has been associated with a first virtual item,
  wherein the non-fungible token being associated with a unique identifier, and
  wherein the indication that the non-fungible token has been associated with a first virtual item is received from a reseller of the first virtual item or an end user activating a tag for a physical product;
a component configured to generate an identifier for the first virtual item based on a type of the first virtual item, at least one image, a release date, and the unique identifier associated with the non-fungible token;
a component configured to record an association between the unique identifier associated with the non-fungible token and the generated identifier;
a component configured to generate a transaction that includes the unique identifier associated with the non-fungible token, the transaction specifying that an owner of the first virtual item; and
a component configured to provide the generated transaction for recordation in a secure tracking system,
  wherein each of the components comprises computer-executable instructions stored in the at least one memory for execution by the at least one processor.

16. The product authentication system of claim 15, wherein the component configured to provide the generated transaction for recordation in the secure tracking system is further configured to record the generated transaction in the secure tracking system.

17. The product authentication system of claim 15, further comprising:

a component configured to receive from a buyer an indication of the generated transaction;
a component configured to send to the owner an offer message offering to purchase the first virtual item for an offer amount; and
a component configured to receive from the owner an accept message.

18. The product authentication system of claim 17, further comprising:

a component configured to provide for recordation in the secure tracking system a transaction to transfer ownership of the first virtual item to the buyer as a new owner of the first virtual item;
a component configured to receive from the new owner of the first virtual item an acceptance message; and
a component configured to provide for recordation in the secure tracking system a transaction indicating acceptance of the first virtual item by the new owner of the first virtual item.

19. The product authentication system of claim 15, wherein the secure tracking system comprises a hashgraph.

20. The product authentication system of claim 15, wherein the secure tracking system comprises a distributed ledger.

21. The product authentication system of claim 15, further comprising:

a component configured to receive a scan of a physical tag attached to a physical product associated with the first virtual item.

* * * * *